2,126,482

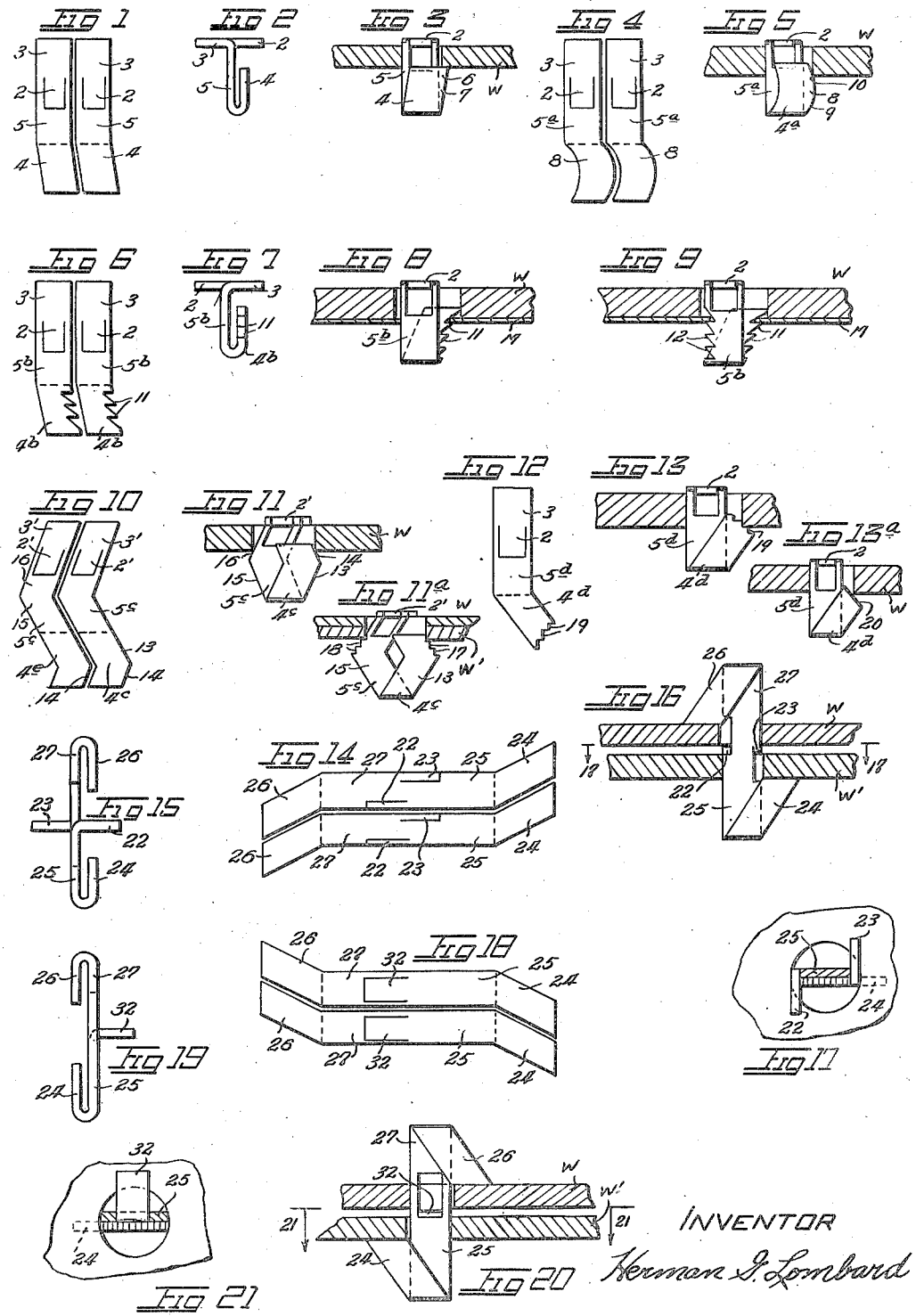
Aug. 9, 1938. H. G. LOMBARD 2,126,482
FASTENING DEVICE
Filed Dec. 23, 1936 2 Sheets-Sheet 1
INVENTOR
Herman G. Lombard Aug. 9, 1938.     H. G. LOMBARD     2,126,482
FASTENING DEVICE
Filed Dec. 23, 1936     2 Sheets—Sheet 2
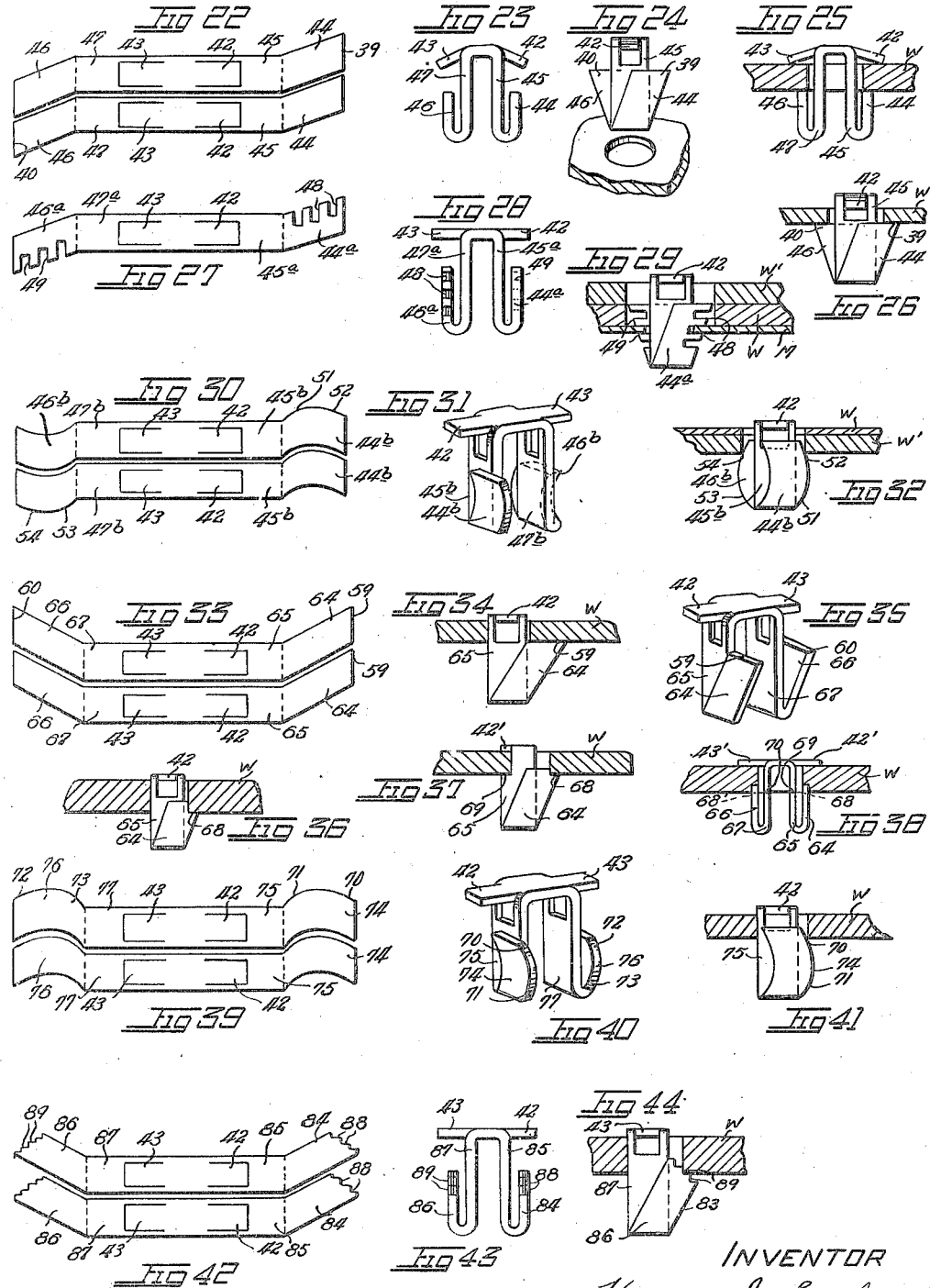
INVENTOR
Herman G. Lombard Patented Aug. 9, 1938

UNITED STATES PATENT OFFICE 2,126,482

FASTENING DEVICE

Herman G. Lombard, Washington, D. C., assignor to Albert H. Tinnerman, Cleveland, Ohio Application December 23, 1936, Serial No. 117,382

12 Claims. (Cl. 85—5)

This invention relates to fastening means of general application and of the type constructed from relatively thin metal material such as wire, or metal sheet stock as, for example sheet spring steel, sheet metal, cold rolled metal and the like.

This application is a continuation in part of a prior co-pending application entitled "Fastening means", filed December 8, 1936, Serial Number 114,825 since issued as Patent 2,077,120, April 13, 1937.

The fastening means of this invention comprise various forms of devices in which the shank structures are composed of relatively yieldable leg elements, the longitudinal edges of which are out of line in their normal position. The disposition of the longitudinal edges of the shank legs is such as to insure an easy, ready insertion of the device in fastening position in work and also an effective engagement thereof and/or the elements thereon, under tension in fastening position against the side walls or edges of an aperture in work.

In general, fastening devices of the type with which this invention deals are constructed of metal sheet material of suitable thickness, such as strip stock or blank stampings because of the ease and simplicity with which the devices may be stamped and formed from such material. Fastening devices made of wire, and in which the shank structures have the essential teachings and action in fastening position of the devices herein disclosed may also be readily constructed.

In any form of fastening device in which there is obtained a yieldable, relative movement of the shank legs an effective fastening means is provided in that on applying such a device to work in an aperture of less width or diameter than the spacing or overall width of the legs, a tension is set up in the legs which tension provides a friction, pressure fit of the device in fastening position and is intended to prevent looseness and removal of the device from such position.

Heretofore such fastening devices have been used with a certain degree of effectiveness in applications and installations where no great degree of movement or vibration is present in the work, or members fastened or supported. However, where any degree of strain, jarring or vibration takes place, the shanks of such types of fasteners tend to loosen from their fastening position and usually become completely removed due to the fact that the legs comprising the shank do not possess sufficient holding power and ability under such conditions.

It is therefore an object of this invention to provide a fastening device in which the shank is composed of relatively yieldable leg elements so disposed and arranged with respect to each other as to permit quick, easy insertion of the devices into an aperture in work by flexing and relative yielding of the legs, yet, when in fastening position have such a degree of stiffness, rigidity and tension stored therein through contact and compression against the side walls of the aperture that substantial resistance is offered to withdrawal of the devices from fastening position, and extraordinary resistance is provided against loosening, or tendency of the device moving out of applied position of its own accord due to vibration, jarring or strain set up in the members fastened or supported, or in a member in which the device is applied.

It is a further object of this invention to provide a fastening device in which the shank is composed of relatively yieldable leg elements the longitudinal edges of which are out of line in normal position and which longitudinal edges may be provided with integral, projecting, or lug means such as shoulders, abutments, or cam surfaces designed to securely engage the work in fastening position and rigidly retain the shank in such position under tension set up in the legs due to the relative contraction, compression, and movement thereof from their normal position by reason of the action of the out-of-line longitudinal edges of the legs contacting the side walls of the aperture to which the device is applied; thus, an effective seating and locking of the devices in fastening position is obtained due to the shank legs attempting to assume their normal position from which they are moved on being inserted into the work aperture and applied to fastening position.

In the prior co-pending case, above mentioned, an effective locking of the shank legs is obtained by the use of angularly disposed, laterally offset leg elements which present the longitudinal edges thereof and/or the elements thereon in out of line position. In the instant case a similar action is obtained in the shank construction by the use of oppositely disposed leg elements the longitudinal edges of which are so preformed as to lie out of line in normal position such that integral locking means thereon as, for example, shoulders, abutments, teeth or the like project beyond the adjacent longitudinal edge of the cooperating shank leg. The various forms of fastening devices herein disclosed are advantageous over those of the said prior co-pending case in that they may be constructed in many instances, of less material and also with the shank legs in such relation at the entering end that the devices are more easily inserted, and advanced to fastening position in the work.

Further objects of the invention will appear as a description thereof proceeds with reference to the accompanying drawings in which like reference characters designate like parts throughout the same and in which:

Fig. 1 represents a series of a form of blank outline from which certain of the fastening devices may be constructed.

Fig. 2 is a side elevation of a fastening device constructed from a blank outline such as represented in Fig. 1.

Fig. 3 shows, in front elevation, the fastening device of Fig. 2 as applied to locked fastening position in work.

Fig. 4 shows a series of blank outlines from which a device having a modified shank structure may be formed.

Fig. 5 shows, in front elevation, a form of fastening device constructed from the blank of Fig. 4 and applied to fastening position in work.

Fig. 6 represents a series of a modified blank outline provided with locking elements, such as teeth, on a longitudinal edge thereof.

Fig. 7 shows, in side elevation, a form of device constructed from a blank of Fig. 6.

Fig. 8 is a front elevation of the device of Fig. 7 applied to lock fastening position in work.

Fig. 9 represents in front elevation an alternate construction of the device of Figs. 7 and 8, in which locking means are provided on the outer longitudinal edges of the shank legs.

Fig. 10 shows a series of blank outlines for a modified form of fastening device.

Fig. 11 is a front elevation view of a device formed from the blank of Fig. 10 and applied to fastening position in work.

Fig. 11a is a front elevation of a modified form of device applied to locked fastening position in work.

Fig. 12 discloses a blank outline for a fastening device in which teeth, provided on an end edge thereof, are adapted to lock the device in fastening position in work.

Fig. 13 shows, in front elevation, a form of fastening means constructed from the blank of Fig. 12 and applied to fastening position in work.

Fig. 13a represents a modification of Fig. 13 applied to fastening position in work.

Figs. 14 to 16 inclusive show a double-ended fastening means in which oppositely disposed shank structures are adapted for fastening, in locked position, superposed members having substantially aligned apertures, Fig. 14 representing a series of blank outlines from which a form of double-ended shank device may be constructed.

Fig. 15 is a side view of a double-ended fastener constructed from the blank of Fig. 14.

Fig. 16 shows, in side elevation, the device of Fig. 15 applied in locked fastening position to secure superposed members having substantially aligned apertures.

Fig. 17 is a section view of Fig. 16 taken along line 17—17.

Fig. 18 represents a series of blank outlines for an alternate construction of double-ended fastening means.

Fig. 19 shows, in side elevation, a double-ended fastener constructed from the blank of Fig. 18.

Fig. 20 shows, in front elevation, the fastening device of Fig. 19 applied in locked fastening position to superposed apertured members having substantially aligned apertures.

Fig. 21 is a section view of Fig. 20 taken along line 21—21.

Fig. 22 represents a series of blank outlines for a modified form of fastening device.

Fig. 23 is a front elevation of a fastening device constructed from a blank of Fig. 22.

Fig. 24 is a side elevation of the device of Fig. 23 about to be applied to an aperture in work.

Fig. 25 is a front elevation of the device of Figs. 23 and 24, applied to locked fastening position in work.

Fig. 26 is a side view of Fig. 25 showing the locking action of the legs.

Fig. 27 represents a blank outline for a modified form of device.

Fig. 28 is a front elevation of the device which may be constructed from the blank of Fig. 27.

Fig. 29 shows, in side elevation, the device of Fig. 28 as applied to locked fastening position in work.

Figs. 30–32 inclusive, represent a modified construction in which the device may be withdrawn from its applied fastening position, Fig. 30 representing a series of blank outlines from which a form of such type of device may be constructed.

Fig. 31 is a front perspective view of a device constructed from a blank such as shown in Fig. 30.

Fig. 32 shows in front elevation, the device of Fig. 31 in applied fastening position in work.

Fig. 33 represents a series of a form of blank outline from which a modified type of locking fastening means may be constructed.

Fig. 34 shows, in side elevation, a device constructed from the blank of Fig. 33 as applied in locked fastening position in work.

Fig. 35 is a front perspective view of the fastening device of Fig. 34 constructed from the blank of Fig. 33.

Fig. 36 shows applied to work a modification of the device of Figs. 34 and 35.

Fig. 37 shows applied to work a further modification of the device of Figs. 34 and 35.

Fig. 38 is a front elevation of Fig. 37.

Fig. 39 represents a series of blank outlines for a construction in which the device may be withdrawn from applied fastening position.

Fig. 40 shows in perspective a form of fastening means constructed from a blank such as shown in Fig. 39.

Fig. 41 shows in side elevation, the device of Fig. 40 applied to fastening position in work.

Fig. 42 represents a series of blank outlines for a modified form of device adapted to lock in fastening position.

Fig. 43 is a front elevation of a device constructed from a blank of Fig. 42.

Fig. 44 is a side view of the fastener of Fig. 43 applied in locked fastening position in work.

Figs. 1–3 inclusive show a form of device which may be constructed from a simple blank outline such as, for example, shown in Fig. 1. The blanks are preferably struck from relatively wide strip stock by a suitable die designed also to strike and deform a head section 2 from within the longitudinal edges of the blank. The head section 2 is adapted to cooperate with the end section 3 of the blank to provide the head of the fastening device as shown in Fig. 2. The opposite end of the blank is designed to be bent away from the said head sections in substantially the form of a U-shape or return bend presenting leg members 4, 5 comprising the shank of the device. The shorter of the leg members, as shown in Fig. 1, is preformed in the stamping of the blank such that portions thereof project beyond the longitudinal edges of the major section of the blank. This preformed projecting portion of the shorter leg 4 is such that on bending the blank along the dotted line indicated in Fig. 1, said projecting portion must lie beyond the adjacent longitudinal edge of the cooperating leg 5 in their normal relation as shown in Fig. 3; the projecting portion of the shorter leg at its end edge thus presents an abutment or shoulder 6 which serves to lock the device in applied fastening position in apertured work W. The shorter leg 4, from the leading end of the device upwardly toward the shoulder 6, presents an outer inclined edge 7 which acts as a guiding means facilitating entrance of the device to an aperture in work, and causes a relative yielding and contraction of the legs laterally from their normal relation as the device is advanced to its home position. When the shoulder 6 clears the adjacent underface of the work W, the legs are free to flex laterally outward with respect to each other toward their normal relation, whereupon the shoulder 6 is disposed in locking position in the work and is maintained in such position by the natural tendency of the legs to resist any movement from their normal relation with respect to each other. Thus the device is seated in locked fastening position in the work and cannot be withdrawn without deforming, damaging, or otherwise mutilating the same.

In Figs. 4 and 5 a blank outline somewhat similar to that of Fig. 1 may be utilized for forming a shank structure which may be withdrawn and removed from fastening position. As shown in Fig. 4 each blank includes a rounded portion 8 projecting beyond the longitudinal edges of the blank proper. This projecting portion is the configuration of a substantial cam element and when the blank of Fig. 4 is bent into a return bend or substantial U-shape along the dotted lines indicated, a shank is provided consisting of a main leg 5a adapted to contact one side of the work aperture, and a shorter, cooperating leg 4a adapted to yieldably engage a corner edge at a substantially opposite side of the work aperture. The projecting portion of the shorter leg 4a includes a guide section 9 and a rounded shoulder or abutment 10 adapted to engage the adjacent edge of the work aperture, the guide section being inclined toward the entering end of the device to facilitate entrance thereof to the work aperture. As the device is advanced to fastening position, the said guide section effects a relative, lateral yielding and contraction of the legs until the shoulder or abutment 10 is properly seated in engagement with the adjacent lower corner edge of the work aperture. Since the shoulder or abutment 10 is inclined inwardly toward the head of the device it acts against the adjacent corner edge of the aperture in the manner of a cam and tends to cause the shank of the device to assume a snug fit in fastening position. At the same time the head member is drawn and maintained in close engagement with the top surface of the work by the action of the legs, under relative lateral contraction against the aperture side walls, attempting to assume their normal relation. This form of device may be readily removed by an axial force applied on the head sections whereby the work engaging edge 10 of the short leg acts in the manner of cam means to cause a relative, lateral contraction of the legs whereby the shank may pass through the work aperture and the device removed without mutilating or otherwise injuring the same.

Figs. 6-8 inclusive disclose a form of fastening means similar in application and use to that described in connection with Figs. 1-3 inclusive. Whereas in the device of Figs. 1-3 inclusive, the projecting edge portion 6 of the shorter leg provides a single shoulder for locking the device in fastening position in a predetermined thickness of work, the projecting edge of the form of device of Figs. 6-8 inclusive is provided with a plurality of shoulders 11 such that the device is adapted for use in locking engagement in various thickness of work. The shoulders 11 may be provided in any expedient manner as by recesses, cut-outs or suitable notches defining teeth, Fig. 8, which teeth are adapted to engage an edge of an aperture in a relatively thin supporting member as, for example, a sheet metal support M. Preferably the shoulders or teeth 11, Fig. 8 are inclined on their lower edges such that they may readily pass the edge of the aperture and thus be quickly and easily snapped home into desired fastening position. In application of this form of device to an aperture in work, the projecting side edge of the shorter leg 4b contacts the aperture side wall and causes a relative contraction thereof laterally with respect to the main leg 5b. A certain degree of relative, lateral contraction is present in the legs when the device is in its home position such that the legs, attempting to assume their normal relation, are continually under tension in fastening position and in the direction of effective locking action of the shoulders or teeth. Thus, the device is maintained rigidly in locked fastening position and will not move out of such position of its own accord under ordinary strain, jarring or vibration; also the device cannot be removed from such position without deforming, damaging the teeth or otherwise mutilating the same.

In Fig. 9, a device applied and used in the manner of that shown in Figs. 7 and 8 is more effectively locked in fastening position by the use of shoulders or teeth on the outer longitudinal edges of both legs. In this form of device the outer edge of the main leg 5b is provided with teeth 12 which teeth act in conjunction with teeth 11 on the shorter leg 4b to engage substantially opposite edges in an aperture in a relatively thin member M, supporting apertured work W.

Figs. 10 and 11 show a form of separable fastening means which may be constructed from strip stock such as shown in Fig. 10. The devices of this form utilize portions of the projecting edge of the shorter leg 4c to provide means whereby the device may be readily snapped into applied fastening position, and is effectively retained in such position, yet may be withdrawn by axial force exerted on the head member. The blanks for this form of device are preferably stamped in the configuration shown in Fig. 10 whereby the projecting portion of the shorter leg 4c presents an inclined guide edge 13, tapered toward the entering end, and an inclined work engaging edge 14 tapered inwardly toward the head. The inclined edge 13 of the shorter leg cooperates with the inclined edge 15 of the main leg to present what may be termed a pilot to the shank, permitting ready insertion thereof into the work aperture, and designed to cause a gradual, relative, lateral contraction of the legs as the device is advanced to fastening position until the work engaging edges 14, 16 are effective, whereupon the legs are free to flex laterally in a reverse direction toward their normal relation. Thus the edge 14 of the shorter leg 13 cooperates with the inclined edge 16 of the main leg 15 to define diverging work engaging surfaces which yieldably engage lower corner edges of the aperture to seat the device in fastening position as shown in Fig. 11. Since such edges 14, 16, engage the work under tension of the laterally contracted legs attempting to assume their normal relation, the devices of this form are effectively retained in fastening position and cannot move from such position of their own accord. Such forms of devices, however, can be removed if desired, by means of an axial force applied to the head sections, 2', 3', whereupon the work engaging edges 14, 16, serve as cam means to effect a gradual, lateral contraction of the legs permitting the shank legs to pass through the work aperture such that the device may be withdrawn and removed without injuring the same, whereupon it may be again used in a similar application in the manner of a snap stud.

In certain applications it is desirable or necessary that the fastening device be positively locked in its applied fastening position. As shown in Fig. 11a the form of device disclosed in Figs. 10 and 11 may be so formed as to effect a positive locking action in fastening position by the use of sharp shoulders, abutments or teeth 17, 18, on the work engaging edges of the respective legs. Such teeth are preferably disposed with respect to each other such that any opposite pair will engage substantially opposite points of the lower corner edge of the work aperture whereby the device is locked in its applied fastening position and cannot be withdrawn without deforming, mutilating or otherwise damaging the same. On the work-engaging edge of each leg a plurality of teeth may be formed whereupon the device is readily adapted for use in fastening different size layers of work W—W' or for securing various thicknesses of material. Although the device is shown as provided with locking teeth 17, 18, on each work engaging edge thereof, it is obvious that the teeth on either edge may be omitted whereupon an effective lock is obtained solely by the shoulders or teeth on the work engaging edge of one leg only.

As shown in Fig. 13 an alternate construction in which a positive locking action of the device in fastening position is obtained may be effected by the use of sharp shoulders, abutments or teeth 19 provided on the end edge of the short leg 4d of a device constructed from a blank such as shown in Fig. 12. In this form of device the end-edge of the short leg 4d is disposed at an angle to the longitudinal edges of the main leg 5d whereupon such end-edge serves as the work engaging edge of the device in fastening position contacting the lower corner of the work aperture. By the use of a plurality of teeth 19 on the said end edge of the short leg, the device is readily adapted for use in various thicknesses of material and cannot be withdrawn without deforming, damaging, or otherwise mutilating the same.

In Fig. 13a is shown a modified construction wherein the end edge of the short leg is disposed at an angle to the longitudinal edges of the main leg 5d, but presents a straight edge surface 20 contacting the lower corner of the work aperture whereby the device is rigidly and snugly seated in fastening position. This form of device may be withdrawn by means of an axial force applied to the head thereof whereupon the inclined straight edge surface 20 serves as a cam element causing a relative lateral contraction of the shank legs 4d, 5d, whereby they may readily pass through the aperture and the device removed.

Figs. 14–21 inclusive disclose various forms of double-ended shank structures for securing apertured members in superimposed relation or for supporting a recessed member relative to an apertured supporting surface. For purposes of illustration the shank arrangement of Figs. 1–3 inclusive is shown as the specific shank structure in the various forms; however it is to be understood that it is fully intended as within the scope of this invention that any other form of shank structure disclosed or any combination of shank structures illustrated herein may be employed in the relation taught and set forth.

In Fig. 14 is disclosed a form of blank which may be stamped simply and economically from relatively wide strip stock without loss or waste of material. In the stamping of the blank, or in a separate operation, integral bearing sections, 22, 23, are deformed and bent in opposite directions as shown in Figs. 15 and 17. The leg member 24 is provided by bending the blank along the dotted lines, Fig. 14, into a substantial U-shape relation with the main leg 25 section to form one shank of the device. The leg 26 may be similarly provided such as to cooperate with leg 27 to form the opposite shank. Although the shorter legs 24, 26, are shown as disposed on the same side of the shank proper defined by main legs 25, 27, Fig. 15, it is obvious that they may be disposed on opposite sides thereof, if desired, to function in substantially the same manner. In operation and use, the double-ended fasteners may be applied by the insertion of one shank thereof into apertured work W', Fig. 16, whereupon the apertured work piece W to be superimposed thereon is applied to the opposite shank. As the said work pieces are moved toward each other the projecting portions of the short legs become properly seated in overlying relation on the outer faces thereof, thereby securely fastening the same in superimposed relation; the bearing sections 22, 23, Fig. 17 extend beyond the edges of the work apertures to cooperate with the shoulders presented by the short legs 24, 26, to prevent axial movement of the opposite shank members in their applied fastening position in the respective work-pieces.

Figs. 18–21 inclusive show an alternate construction of double-ended fastening means wherein the bearing section comprises an element 32 stamped from the blank proper to extend beyond the edges of the work apertures as shown in Fig. 21. In operation and use this form of double-ended fastening device is similar to that described in connection with Figs. 14–17 inclusive.

Figs. 22–26 inclusive disclose a form of fastening means wherein the shank is composed of a pair of main leg members each carrying a shorter leg having portions thereof projecting beyond the longitudinal edges of their respective main legs, whereby shoulders, adapted to lock in applied fastening position against the underface of the work are provided. The device may be constructed from a blank such as shown in Fig. 22 from which are deformed sections 42, 43, serving as the head of the device, as shown in Fig. 23. The main legs 45, 47, are bent downwardly from the said head sections to form the shank of the device, the short legs 44, 46, being disposed in return bends relative to said main legs and having oppositely projecting shoulders 39, 40, adapted to lock the device in applied fastening position in the work as shown in Fig. 26. The head sections 42, 43, may be bent, downwardly toward the shank legs such that portions thereof are axially yieldable relative to said shank legs. This yieldable relation of the head sections 42, 43, with respect to the shank legs is important in that upon application of the device to fastening position, the projecting, locking shoulders 39, 40, of the short legs are drawn into firm, snug engagement with the underface of the work and are placed under an axial tension in such engagement due to axial pull exerted on the main legs 45, 47, by the said yieldable head sections bearing against the upper face of the work. This yieldable relation of the head sections is also important in that devices so provided are adapted for use in various thicknesses of material. Obviously various head structures may be employed and it is therefore fully intended as within the scope of this invention that, in any form of device having cooperating head sections, said head sections be suitably deformed to provide a similar yieldable relation with respect to their shanks.

Figs. 27-29 inclusive show an alternate construction wherein recesses provided in the projecting portions of the short legs 44a, 46a, define oppositely disposed series of sharp shoulders or teeth 48, 49, whereby the device is adapted for securing in various thicknesses of work. As shown in Fig. 29 any opposite pair of teeth are designed to effectively engage, in positive locked relation, the edges of an aperture in a relatively thin supporting member such as sheet metal piece M having superposed thereon apertured layers of work W, W'. An effective fastening means of this type may also be obtained by providing recesses defining teeth on the projecting edge of one short leg only, whereby the outer edge of the other short leg contacts a substantially opposite side of the aperture under tension to maintain the device rigidly in its applied fastening position.

In certain installations, it is necessary or desirable that a fastening means be employed which is quickly and easily applied to fastening position, yet may be withdrawn and again used, much in the manner of a snap stud. A device of this type may be constructed from a blank outline such as shown in Fig. 30 in which the outer projecting edges of the short legs 44b, 45b, are preformed to present substantial cam elements. The short legs are provided by being bent, as indicated by dotted lines Fig. 30, into U-shape relation with the main legs 45b, 47b, whereby the said cam elements extend in opposite directions and define guide edges 51, 53, and work engaging edges 52, 54, as shown in Fig. 32. As the device is applied to a work aperture the guide edges are designed to cause a gradual relative, lateral contraction of the short legs 44b, 46b, relative to the main legs 45b, 47b, whereby the shank may pass to its applied fastening position with the edges 52, 54, engaging the lower corner edges of the work aperture, and under tension exerted by the said short legs attempting to assume their normal relation with respect to the main legs. The device of this form may be readily withdrawn by axial force applied to the head sections whereby the work engaging edges 52, 54 serve as cam means causing a lateral relative contraction of the legs sufficient to permit the shank to pass through the aperture and be withdrawn.

In Figs. 33-35 inclusive is shown a form of fastening means similar in operation and use to that shown in Figs. 22-25 inclusive in that the projecting portions of the short legs present sharp shoulders designed to positively lock the device in applied position. As shown in Fig. 33, the short legs 64, 66 are preformed to provide projecting portions which present locking shoulders or abutments 59, 60, extending in the same direction to engage one side of a work aperture at substantially adjacent points. On being applied to apertured work W, Fig. 34, the inclined edges of the short legs cause a relative, lateral, contraction of the legs until the shoulders 59, 60, clear the adjacent underface of the work whereupon the legs are free to spring laterally toward the normal relation with the shoulders 59, 60, overlying the adjacent edge of the aperture in locked relation with the outer edges of the main legs 65, 67, contacting the side wall of the aperture at a substantially opposite edge thereof.

As shown in Fig. 36 a modified construction involves the use of a recess at the end edge of each of the short legs, which recesses provide shoulders 68, 68', engaging the adjacent corner of the aperture to cause a seating of the legs under tension in locked position.

Figs. 37 and 38 show a further modification in which the head sections 42', 43' are struck at the outer longitudinal edge of the main legs 65, 67, whereby shoulders 69, 70, Fig. 38, are provided, which shoulders are designed to cooperate with shoulders 68, 68' on the short legs to seat the shank legs under tension in fastening position and most effectively lock the device in such position both in a lateral and axial direction.

Figs. 39-41 inclusive show a form of fastening means similar in application and use to the form described in connection with Figs. 30-32 inclusive. The projecting portions of the short legs 74, 76, are preformed in the configuration of substantial cam elements extending in the same direction as shown in Fig. 40, to engage the lower corner of a work aperture at substantially adjacent points. The projecting portions of the short legs 74, 76, comprise guide edges 71, 73 and work engaging edges 70—72. On being applied to an aperture in work the said guide edges 71, 73, cause a gradual, relative contraction of the legs until the device is advanced to its home position, Fig. 41, whereupon the work-engaging edges 70—72 of the short legs yieldably engage the adjacent corner of the aperture with the outer longitudinal edges of the main legs 75, 77 in engagement with the side walls thereof at substantially opposite points. This form of device may be withdrawn by an axial force applied to the head sections whereby the work engaging edges 70, 72, act as cam elements causing a relative, lateral contraction of the legs against the aperture side walls sufficient to pass the shank and permit the device to be removed.

Figs. 42-44 inclusive show a form of fastening means similar in application to that of Figs. 40-41 but distinguished therefrom in that a positive locking of the device in fastening position is obtained. The positive locking action is effected through the use of series of teeth 88, 89, provided on the projecting end-edges of the short legs 84, 86. On insertion of this form of device to an aperture in work, the inclined outer edges 83, Fig. 44, of the short legs cause a relative contraction thereof with respect to the main legs 85, 87, until the end edges of the short legs come into contact with the underface of the work whereupon they may flex laterally toward their normal position to force such teeth of the series 88, 89, which are suitably disposed, into locking engagement with the lower corner of the work aperture; the outer longitudinal edges of the main legs 85, 87, are adapted to contact the side walls of the aperture at points substantially opposite to those engaged by the teeth 88, 89, thus maintaining shank legs of the device under tension in locked fastening position.

Various changes and modifications obviously may be made in the arrangement and construction of the devices herein disclosed and is therefore desired that it be understood that the scope of the invention be determined by the appended claims rather than the foregoing description.

What is claimed is:

1. A sheet metal fastening device comprising a blank bent back upon itself along a line substantially at right angles to its longitudinal axis to present cooperating leg members integrally united to form a leading end for the device, said leg members providing a shank of greater length than the thickness of the supporting structure to which it is applied, one of said leg members having a shoulder projecting laterally beyond the outline of its cooperating leg and being adapted for relative, lateral yielding movement on being applied to fastening position in an aperture in said supporting structure, said projecting shoulder engaging the underface of said supporting structure in the applied fastening position of the device.

2. A sheet metal fastening device comprising a blank bent back upon itself along a line substantially at right angles to its longitudinal axis to present cooperating leg members integrally united to form a leading end for the device, one of said leg members being of less length than the other having portions thereof projecting laterally beyond the outline of its cooperating leg and being adapted for relative, lateral yielding movement on being applied to fastening position in apertured work.

3. A sheet metal fastening device comprising a blank bent back upon itself along a line substantially at right angles to its longitudinal axis to present cooperating leg members integrally united to form a leading end for the device, one of said leg members being of less length than the other having portions thereof projecting laterally beyond the outline of its cooperating leg, said portions providing a work engaging shoulder and guide means facilitating application of the device to an apertured part by effecting gradual, relative, lateral yielding movement of said leg members.

4. A sheet metal fastening device comprising a blank bent back upon itself along a line substantially at right angles to its longitudinal axis to present cooperating leg members integrally united to form a leading end for a shank of greater length than the thickness of the supporting structure to which it is applied, one of the leg members thus provided having a portion thereof projecting laterally beyond the outline of its cooperating leg and being adapted for relative, lateral yielding movement on being applied to fastening position in an aperture in said supporting structure, said laterally projecting portion including a shoulder engaging the underface of the supporting structure in the applied fastening position of the device.

5. A sheet metal fastening device comprising a blank bent back upon itself along a line substantially at right angles to its longitudinal axis to present cooperating leg members integrally united to form a leading end for a shank of greater length than the thickness of the supporting structure to which it is applied, one of the leg members thus provided having a portion thereof projecting laterally beyond the outline of its cooperating leg and being adapted for relative, lateral yielding movement on being applied to fastening position in an aperture in said supporting structure, said laterally projecting portion including guide edges facilitating application of the device to said aperture and a shoulder engaging the underface of the supporting structure in the applied fastening position of the device.

6. A sheet metal fastening device comprising a blank bent back upon itself along a line substantially at right angles to its longitudinal axis to present cooperating leg members integrally united to form a leading end for a shank of greater length than the thickness of the supporting structure to which it is applied, one of the leg members thus provided being of less length than the other and having a portion thereof projecting laterally beyond the outline of its cooperating leg thereby being adapted for relative, lateral yielding movement on being applied to fastening position in an aperture in said supporting structure, said laterally projecting portion including a shoulder engaging the underface of said supporting structure in the applied fastening position of the device.

7. A sheet metal fastening device comprising a blank bent back upon itself along a line substantially at right angles to its longitudinal axis to present cooperating leg members integrally united to form a leading end for a device having a shank of greater length than the thickness of the supporting structure to which it is applied, one of said leg members being shorter than the other and having a portion thereof projecting laterally beyond the outline of its cooperating leg, said leg members being adapted for relative, lateral yielding movement on being applied to fastening position in an aperture in said supporting structure, said laterally projecting portion of the shorter leg including guide edges facilitating application of the device to said aperture and a shoulder engaging the underface of the supporting structure in the applied fastening position of the device.

8. A sheet metal fastening device comprising a blank bent back upon itself along a line substantially at right angles to its longitudinal axis to present cooperating leg members integrally united to form a leading end for a device having a shank of greater length than the thickness of the supporting structure to which it is applied, one of said leg members being shorter than the other and having a portion thereof projecting laterally beyond the outline of its cooperating leg thereby being adapted for relative, lateral yielding movement on being applied to fastening position in an aperture in said supporting structure, the extremity of said laterally projecting portion of the shorter leg member comprising a shoulder engaging the underface of said supporting structure in the applied fastening position of the device.

9. A sheet metal fastening device comprising a blank bent back upon itself along a line substantially at right angles to its longitudinal axis to present cooperating leg members integrally united to form a leading end for a device having a shank of greater length than the thickness of the supporting structure to which it is applied, one of said leg members being shorter than the other and having a portion thereof projecting laterally beyond the outline of its cooperating leg, said leg members being adapted for relative, lateral yielding movement on being applied to fastening position in an aperture in said supporting structure, said laterally projecting portion of the shorter leg member including guide edges facilitating application of the device to said aperture and the extremity thereof comprising a shoulder engaging the underface of said supporting structure in the applied fastening position of the device.

10. A sheet metal fastening device comprising a blank bent intermediate its ends to form a head and holding elements on either side thereof, at least one of said holding elements comprising a section of the blank bent back upon itself along a line at substantially right angles to the longitudinal axis of the device to provide a shank member of greater length than the supporting structure to which it is applied, said shank member thus provided comprising a pair of leg members one of which has a portion projecting laterally beyond the outline of its cooperating leg and being adapted for relative, lateral yielding movement on being applied to fastening position in an aperture in said supporting structure, said laterally projecting portion including a shoulder engaging the underface of the supporting structure in the applied fastening position of the device.

11. A sheet metal fastening device comprising a blank bent intermediate its ends to form a head and holding elements on either side thereof, at least one of said holding elements comprising a section of the blank bent back upon itself along a line at substantially right angles to the longitudinal axis of the device to provide a shank member of greater length than the supporting structure to which it is applied, said shank member thus provided comprising a pair of leg members one of which is shorter than the other and includes a portion projecting laterally beyond the outline of its cooperating leg, said leg members being adapted for relative, lateral yielding movement on being applied to fastening position in an aperture in said supporting structure, said laterally projecting portion of the shorter leg including a shoulder engaging the underface of the supporting structure in the applied fastening position of the device.

12. A sheet metal fastening device comprising a blank bent intermediate its ends to form a head and holding elements on either side thereof, at least one of said holding elements comprising a section of the blank bent back upon itself along a line at substantially right angles to the longitudinal axis of the device to provide a shank member of greater length than the supporting structure to which it is applied, said shank member thus provided comprising a pair of leg members one of which is shorter than the other and includes a portion projecting laterally beyond the outline of its cooperating leg, said leg members being adapted for relative, lateral yielding movement on being applied to fastening position in an aperture in said supporting structure, the extremity of said laterally projecting portion of the shorter leg being formed into a shoulder adapted to engage the underface of the supporting structure in the applied fastening position of the device.

HERMAN G. LOMBARD.